United States Patent
Hada et al.

(10) Patent No.: US 6,665,713 B1
(45) Date of Patent: Dec. 16, 2003

(54) TOPOLOGY INFORMATION AUTOMATIC CONFIGURATION METHOD AND ITS TOPOLOGY INFORMATION AUTOMATIC CONFIGURATION SYSTEM

(75) Inventors: Masanori Hada, Tokyo (JP); Masahiro Kido, Tokyo (JP); Yasuhiro Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 412 days.

(21) Appl. No.: 09/587,802

(22) Filed: Jun. 6, 2000

(30) Foreign Application Priority Data

Jun. 8, 1999 (JP) ............................................ 11-160649

(51) Int. Cl.[7] ............................................ G06F 15/177
(52) U.S. Cl. ...................... 709/220; 709/221; 709/222; 709/223; 709/224; 370/252; 370/254
(58) Field of Search ................................. 709/220, 221, 709/222, 223, 224; 370/254, 252; 713/100; 340/285, 825

(56) References Cited

U.S. PATENT DOCUMENTS 5,796,736 A * 8/1998 Suzuki ........................ 370/254
6,167,445 A * 12/2000 Gai et al. .................... 709/223
6,286,038 B1 * 9/2001 Reichmeyer et al. ........ 709/220
6,377,987 B1 * 4/2002 Kracht ......................... 709/220

FOREIGN PATENT DOCUMENTS

JP          05-136794          6/1993

* cited by examiner

*Primary Examiner*—Ayaz Sheikh
*Assistant Examiner*—Thu Ha Nguyen
(74) *Attorney, Agent, or Firm*—Sughrue Mion, PLLC

(57) ABSTRACT

A topology information automatic configuration method for configuring topology information indicating how to connect each equipment, based on configuration information, including IP address and subnet mask, established for every interface of each equipment connected to a network, comprising: a network address calculation step for obtaining network address of a subnetwork to which an interface is connected, as for every interface, based on the IP address and the subnet mask of the interface; and a topology information configuration step for configuring the topology information indicating that each equipment including an interface having the identical network address obtained in said network address calculation step, is connected to the subnetwork of the above identical network address and that the equipment having a plurality of interfaces connect together the subnetworks indicated by the network addresses of the plurality of interfaces obtained in said network address calculation step.

12 Claims, 16 Drawing Sheets

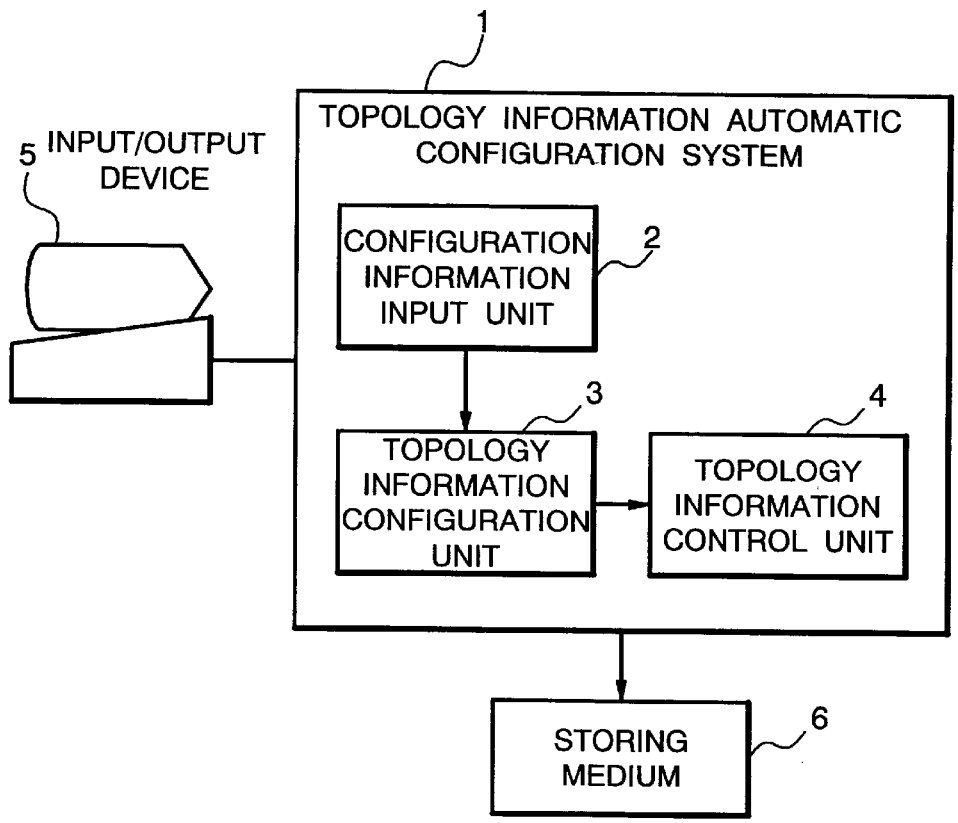

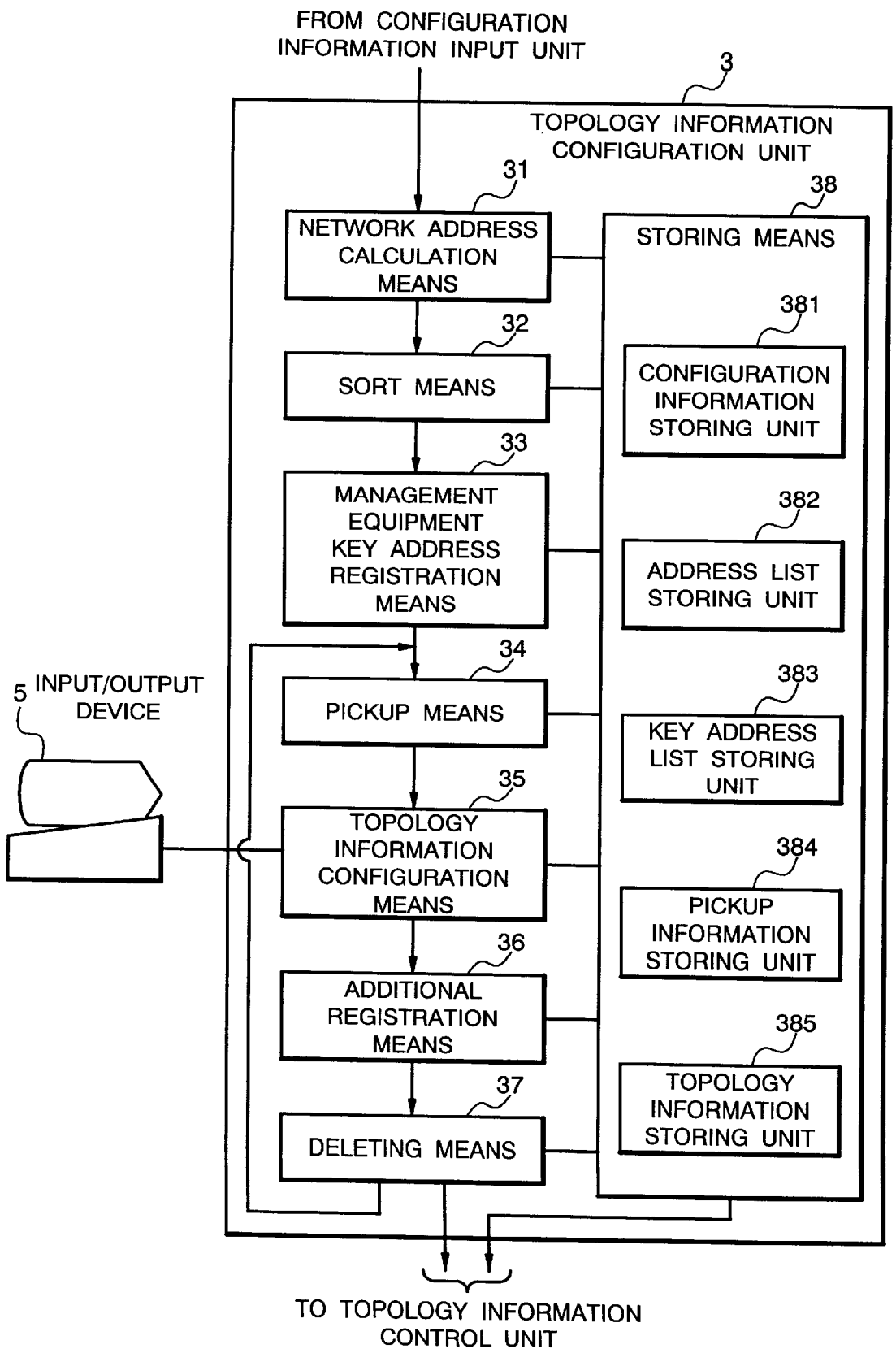

FIG. 4
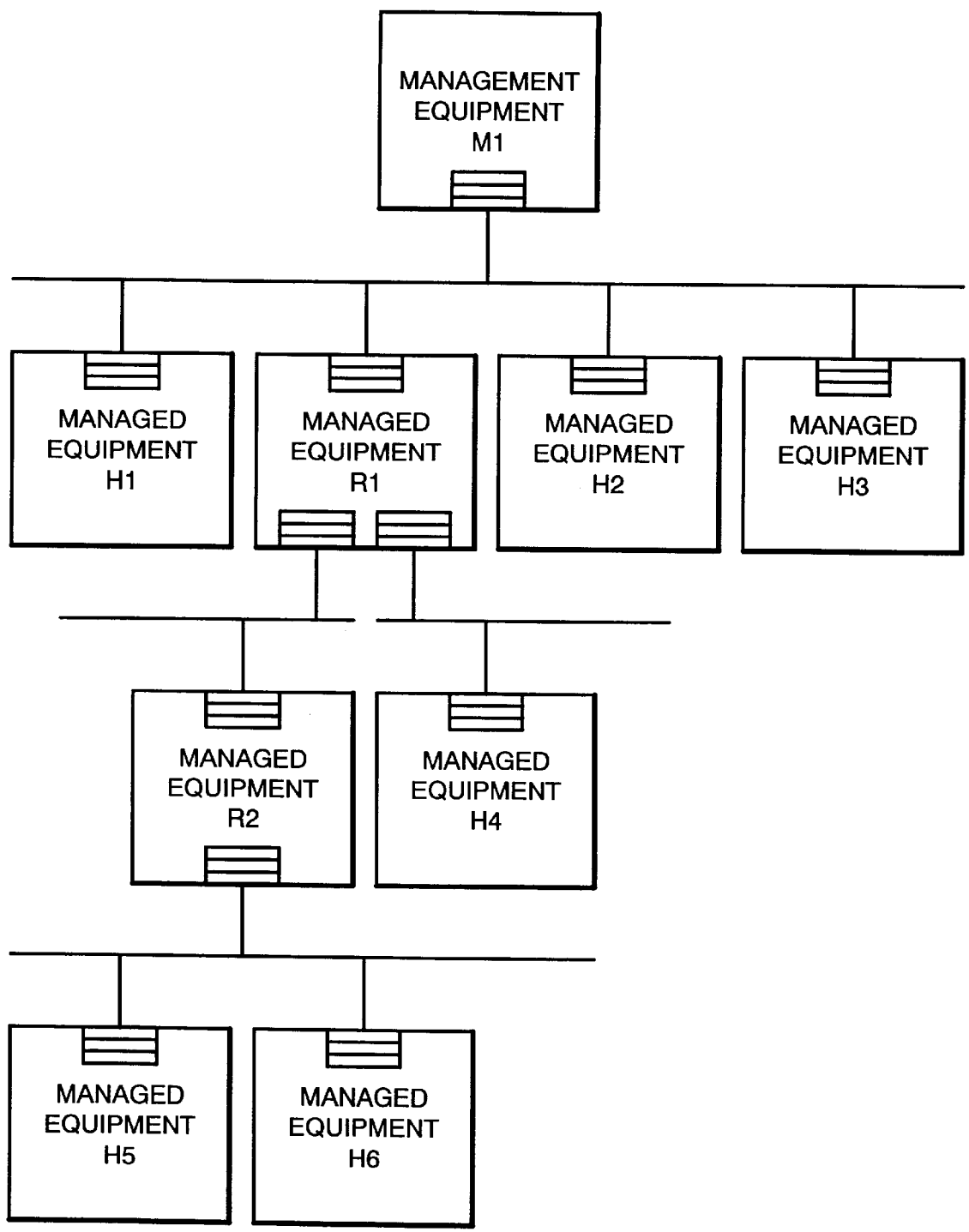
 REPRESENTS AN INTERFACE

FIG. 5

| | | MANAGEMENT EQUIPMENT M1 | MANAGED EQUIPMENT H1 | MANAGED EQUIPMENT R1 | MANAGED EQUIPMENT H2 | MANAGED EQUIPMENT H3 | MANAGED EQUIPMENT R2 | MANAGED EQUIPMENT H4 | MANAGED EQUIPMENT H5 | MANAGED EQUIPMENT H6 |
|---|---|---|---|---|---|---|---|---|---|---|
| | EQUIPMENT NAME | M1 | H1 | R1 | H2 | H3 | R2 | H4 | H5 | H6 |
| INTERFACE 1 | IP ADDRESS | 123.4.5.8 | 123.4.5.10 | 123.4.5.11 | 123.4.5.12 | 123.4.5.13 | 123.4.6.2 | 123.4.7.2 | 123.4.7.2 | 123.4.7.3 |
| | SUBNET MASK | 255.255.255.0 | 255.255.255.0 | 255.255.255.0 | 255.255.255.0 | 255.255.255.0 | 255.255.255.0 | 255.255.255.0 | 255.255.255.0 | 255.255.255.0 |
| | ROUTING INFORMATION | 123.4.5.1 | 123.4.5.1 | 123.4.5.0 | 123.4.5.1 | 123.4.5.1 | 123.4.6.0 | 123.4.7.1 | 123.4.7.1 | 123.4.7.1 |
| | GROUP ID | | | | | | | 111 | 222 | 222 |
| INTERFACE 2 | IP ADDRESS | | | 123.4.6.1 | | | 123.4.7.1 | | | |
| | SUBNET MASK | | | 255.255.255.0 | | | 255.255.255.0 | | | |
| | ROUTING INFORMATION | | | 123.4.6.0 | | | 123.4.7.0 | | | |
| | GROUP ID | | | | | | 222 | | | |
| INTERFACE 3 | IP ADDRESS | | | 123.4.7.1 | | | | | | |
| | SUBNET MASK | | | 255.255.255.0 | | | | | | |
| | ROUTING INFORMATION | | | 123.4.7.0 | | | | | | |
| | GROUP ID | | | 111 | | | | | | |

FIG. 7

ADDRESS LIST

| EQUIPMENT NAME | NETWORK ADDRESS | GROUP ID |
|---|---|---|
| M1 | 123.4.5.0 | |
| H1 | 123.4.5.0 | |
| R1 | 123.4.5.0 | |
| R1 | 123.4.6.0 | |
| R1 | 123.4.7.0 | 111 |
| H2 | 123.4.5.0 | |
| H3 | 123.4.5.0 | |
| H4 | 123.4.7.0 | 111 |
| H5 | 123.4.7.0 | 222 |
| H6 | 123.4.7.0 | 222 |
| R2 | 123.4.6.0 | |
| R2 | 123.4.7.0 | 222 |

FIG. 8

ADDRESS LIST

| EQUIPMENT NAME | NETWORK ADDRESS | GROUP ID |
|---|---|---|
| M1 | 123.4.5.0 | |
| H1 | 123.4.5.0 | |
| R1 | 123.4.5.0 | |
| H2 | 123.4.5.0 | |
| H3 | 123.4.5.0 | |
| R1 | 123.4.6.0 | |
| R2 | 123.4.6.0 | |
| R1 | 123.4.7.0 | 111 |
| H4 | 123.4.7.0 | 111 |
| H5 | 123.4.7.0 | 222 |
| H6 | 123.4.7.0 | 222 |
| R2 | 123.4.7.0 | 222 |

FIG. 9

KEY ADDRESS LIST

| NETWORK ADDRESS | GROUP ID |
|---|---|
| 123.4.5.0 | |

FIG.10

PICKUP FROM THE ADDRESS LIST

| EQUIPMENT NAME | NETWORK ADDRESS | GROUP ID |
|---|---|---|
| M1 | 123.4.5.0 | |
| H1 | 123.4.5.0 | |
| R1 | 123.4.5.0 | |
| H2 | 123.4.5.0 | |
| H3 | 123.4.5.0 | |

FIG.11

| LOCAL SEGMENT NAME | | NETWORK ADDRESS | GROUP ID |
|---|---|---|---|
| | EQUIPMENT NAME | IP ADDRESS | NAME OF THE OTHER RELATIVE LOCAL SEGMENT |
| LS1 | | 123.4.5.0 | |
| | M1 | 123.4.5.8 | |
| | H1 | 123.4.5.10 | |
| | R1 | 123.4.5.11 | 123.4.6.0, 123.4.7.0/111 |
| | H2 | 123.4.5.12 | |
| | H3 | 123.4.5.13 | |

FIG. 13

KEY ADDRESS LIST

| NETWORK ADDRESS | GROUP ID |
|---|---|
| 123.4.5.0 | |
| 123.4.5.0 | |
| 123.4.6.0 | |
| 123.4.7.0 | 111 |

FIG. 14

ADDRESS LIST

| EQUIPMENT NAME | NETWORK ADDRESS | GROUP ID |
|---|---|---|
| R1 | 123.4.6.0 | |
| R2 | 123.4.6.0 | |
| R1 | 123.4.7.0 | 111 |
| H4 | 123.4.7.0 | 111 |
| H5 | 123.4.7.0 | 222 |
| H6 | 123.4.7.0 | 222 |
| R2 | 123.4.7.0 | 222 |

FIG. 15

KEY ADDRESS LIST

| NETWORK ADDRESS | GROUP ID |
|---|---|
| 123.4.6.0 | |
| 123.4.7.0 | 111 |

FIG. 16

PICKUP FROM THE ADDRESS LIST

| EQUIPMENT NAME | NETWORK ADDRESS | GROUP ID |
|---|---|---|
| R1 | 123.4.6.0 | |
| R2 | 123.4.6.0 | |

FIG. 17

| LOCAL SEGMENT NAME | | NETWORK ADDRESS | GROUP ID | |
|---|---|---|---|---|
| | EQUIPMENT NAME | IP ADDRESS | NAME OF THE OTHER RELATIVE LOCAL SEGMENT | |
| LS1 | | 123.4.5.0 | | |
| | M1 | 123.4.5.8 | | |
| | H1 | 123.4.5.10 | | |
| | R1 | 123.4.5.11 | LS2, 123.4.7.0 / 111 | |
| | H2 | 123.4.5.12 | | |
| | H3 | 123.4.5.13 | | |
| LS2 | | 123.4.6.0 | | |
| | R1 | 123.4.6.1 | LS1, 123.4.7.0 / 111 | |
| | R2 | 123.4.6.2 | 123.4.7.0 / 222 | |

FIG.19

KEY ADDRESS LIST

| NETWORK ADDRESS | GROUP ID |
|---|---|
| 123.4.6.0 | |
| 123.4.7.0 | 111 |
| 123.4.6.0 | |
| 123.4.7.0 | 222 |

FIG.20

ADDRESS LIST

| EQUIPMENT NAME | NETWORK ADDRESS | GROUP ID |
|---|---|---|
| R1 | 123.4.7.0 | 111 |
| H4 | 123.4.7.0 | 111 |
| H5 | 123.4.7.0 | 222 |
| H6 | 123.4.7.0 | 222 |
| R2 | 123.4.7.0 | 222 |

FIG.21

KEY ADDRESS LIST

| NETWORK ADDRESS | GROUP ID |
|---|---|
| 123.4.7.0 | 111 |
| 123.4.7.0 | 222 |

FIG. 22

| LOCAL SEGMENT NAME | | NETWORK ADDRESS | GROUP ID |
|---|---|---|---|
| | EQUIPMENT NAME | IP ADDRESS | NAME OF THE OTHER RELATIVE LOCAL SEGMENT |
| LS1 | | 123.4.5.0 | |
| | M1 | 123.4.5.8 | |
| | H1 | 123.4.5.10 | |
| | R1 | 123.4.5.11 | LS2, LS3 |
| | H2 | 123.4.5.12 | |
| | H3 | 123.4.5.13 | |
| LS2 | | 123.4.6.0 | |
| | R1 | 123.4.6.1 | LS1, LS3 |
| | R2 | 123.4.6.2 | LS4 |
| LS3 | | 123.4.7.0 | 111 |
| | R1 | 123.4.7.1 | LS1, LS2 |
| | H4 | 123.4.7.2 | |
| LS4 | | 123.4.7.0 | 222 |
| | R2 | 123.4.7.1 | LS2 |
| | H5 | 123.4.7.2 | |
| | H6 | 123.4.7.3 | |

FIG. 23
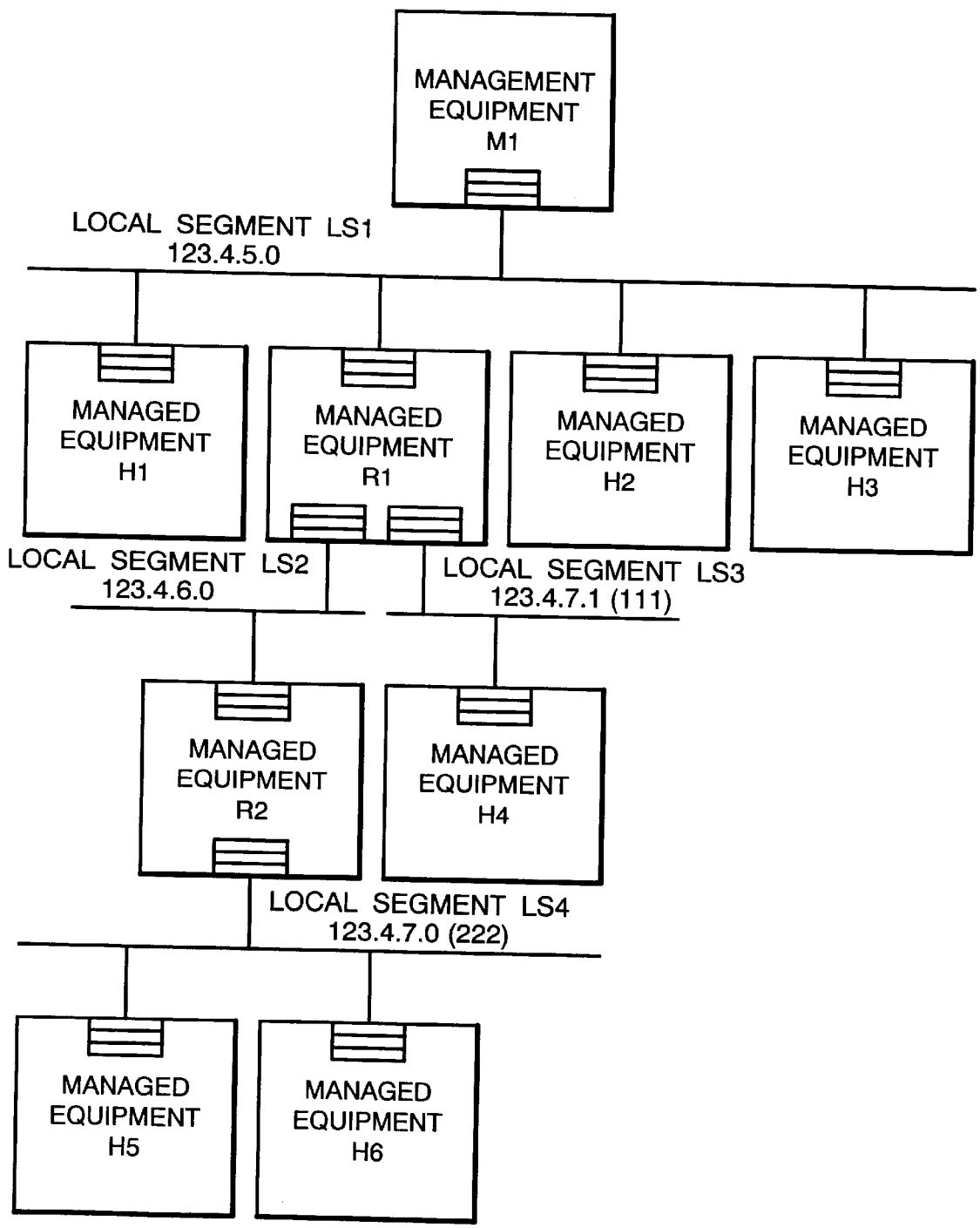
REPRESENTS AN INTERFACE

TOPOLOGY INFORMATION AUTOMATIC CONFIGURATION METHOD AND ITS TOPOLOGY INFORMATION AUTOMATIC CONFIGURATION SYSTEM

BACKGROUNDS OF THE INVENTION

1. Field of the Invention

The present invention relates to a technique for automatically configuring information of topology indicating how to connect each equipment such as a router, a host computer, and the like with a network, and more particularly, it relates to a technique for automatically configuring topology information based on the configuration information set for an interface of each equipment.

2. Description of the Related Art

The conventional technique for automatically configuring topology information is designed to configure information of topology in management equipment based on the information sent from each equipment connected to a network, by transferring the information necessary for configuring topology information from each equipment to the management equipment of the network. For example, a network configuration recognizing device disclosed in Japanese Patent Publication Laid-Open (Kokai) No. Heisei 5-136794, is designed to transfer the sending source address of a packet received by each port of a hub, from the hub to the management equipment and according to the information transferred from the hub, configure the topology information in the management equipment.

The conventional technique enables automatic configuration of topology information as for a network already configured. However, in need for automatic configuration of topology information as for a network to be configured from now on, the conventional technique will never do. The case of requiring topology information before configuration of a network is as follows, by way of example.

In the case of configuration of a network, it is necessary to set the configuration information including IP address, subnet mask, routing information, and the like, in each equipment such as a router, a host computer, and the like to be connected to the network. In order to set this configuration information, generally a worker needs to visit the setting place of each equipment. Such a method takes a lot of troubles for setting of the configuration information, and the improvement is desired.

As a method in order to reply to the above desire, such a method can be considered, as transferring configuration information to be set for an interface of each managed equipment, from management equipment of a network to the corresponding managed equipment, through a network, thereby to set the configuration information sent to the managed equipment. In order to realize this method, it is also necessary to input into the management equipment, the topology information indicating how to connect each managed equipment to a network, in addition to the configuration information, so as to have the management equipment recognize the network configuration. Namely, in order to automatically set the configuration information in every managed equipment, it becomes necessary to establish the configuration information in every managed equipment sequentially in the order of starting from one managed equipment connected to the upstream of a network (nearest to the management equipment), thereby requiring the input of the topology information in the management equipment.

For example, when management equipment 101 sets the configuration information in managed equipment 102 and 103, in a network as shown in FIG. 24, it is necessary to set the configuration information in the managed equipment 102 at first, and thereafter set the configuration information in the managed equipment 103. At this time, if the topology information is not entered in the management equipment 101, there is a possibility of setting the configuration information in the managed equipment 103 before setting the configuration information in the managed equipment 102. In this case, the information for setting the configuration information is not relayed correctly by the managed equipment 102, thereby failing in setting the configuration information.

When automatically setting the configuration information in each managed equipment via a network, it is also necessary to enter the topology information of a network, in addition to the configuration information to be set in each managed equipment. However, even if setting of the configuration information is automated, an additional trouble of configuring and entering the topology information would spoil the merit of automatic setting of the configuration information, and therefore, the improvement is desired.

SUMMARY OF THE INVENTION

An object of the present invention is to provide a topology information automatic configuration method and its topology information automatic configuration system capable of automatically configuring topology information based on the configuration information, even before actual configuration of a network.

Another object of the present invention is to provide a topology information automatic configuration method and its topology information automatic configuration system capable of configuring the topology information, even if there exists a subnetwork having the identical network address within a network using a local address, in other words, even if the network addresses overlap each other.

Further another object of the present invention is to provide a topology information automatic configuration method and its topology information automatic configuration system capable of detecting an error of the configuration information of each equipment before actual configuration of a network.

According to the first aspect of the invention, a topology information automatic configuration method for configuring topology information indicating how to connect each equipment, based on configuration information, including IP address and subnet mask, established for every interface of each equipment connected to a network, comprises a network address calculation step for obtaining network address of a subnetwork to which an interface is connected, as for every interface, based on the IP address and the subnet mask of the interface, and a topology information configuration step for configuring the topology information indicating that each equipment including an interface having the identical network address obtained in the network address calculation step, is connected to the subnetwork of the above identical network address and that the equipment having a plurality of interfaces connect together the subnetworks indicated by the network addresses of the plurality of interfaces obtained in the network address calculation step.

According to the second aspect of the invention, a topology information automatic configuration method for configuring topology information indicating how to connect each equipment, based on configuration information, including equipment name, IP address, and subnet mask, established for every interface of management equipment and a plurality of managed equipment connected to a network, comprises a network address calculation step for obtaining network address of a subnetwork to which an interface is connected, as for every interface, based on the IP address and the subnet mask of the interface, and storing a pair of the obtained network address of each interface and the equipment name of the corresponding equipment having the interface, into an address list storing unit, a management equipment key address registration step for storing a pair of the network address of an interface owned by the management equipment which is obtained in the network address calculation step and the corresponding equipment name, into a key address list storing unit, a pickup step for picking up the same information as that of the head of the network addresses stored in the key address list storing unit, from the information of each interface stored in the address list storing unit, and storing the same into a pickup information storing unit, and a topology information configuration step for configuring the topology information indicating that the equipment having an interface whose information is stored in the pickup information storing unit in the pickup step, is connected to the identical subnetwork represented by the network address within the information and that the equipment having a plurality of interfaces, of all the equipment each having an interface whose information is stored in the pickup information storing unit, connect together the subnetworks indicated by the network addresses of the plurality of interfaces stored in the address list storing unit.

In the preferred construction, the topology information automatic configuration method, further includes an additional registration step for additionally storing a pair of the network address and the corresponding equipment name as for all the interfaces owned by the equipment in the rearmost portion of the key address list storing unit, when there exists some equipment which has a plurality of interfaces and whose information is not stored in the key address list, in all the equipment each having an interface whose information is stored in the pickup information storing unit, and a deleting step for deleting the information which has been stored in the pickup information storing unit from the information stored in the address list storing unit as well as deleting the same information as the head information from the information stored in the key address list storing unit, and thereafter performing the pickup step on condition that some information remains in the key address list storing unit.

According to another aspect of the invention, a topology information automatic configuration method for configuring topology information indicating how to connect each equipment, based on configuration information, including IP address and subnet mask and further including group ID for distinguishing each subnetwork as for an interface of the equipment connected to one of the subnetworks given the identical network address existing in the network, established for every interface of each equipment connected to a network, comprises the steps of a network address calculation step for obtaining network address of a subnetwork to which an interface is connected, as for every interface of the respective equipment, based on the IP address and the subnet mask of the interface, and a topology information configuration step for configuring the topology information indicating that each equipment including an interface having the identical network address obtained in the network address calculation step and including no group ID in the configuration information, is connected to the subnetwork of the above identical network address, the equipment having an interface of the identical network address obtained and the equal group ID included in the configuration information, is connected to a subnetwork represented by the above identical network address and the group ID, and that the equipment having a plurality of interfaces connects together the subnetworks represented by the network addresses of the interfaces owned by the equipment or each pair of the network address and group ID of an interface.

According to another aspect of the invention, a topology information automatic configuration method for configuring topology information indicating how to connect each equipment, based on configuration information, including equipment name, IP address and subnet mask and further including group ID for distinguishing each subnetwork as for an interface of the equipment connected to one of the subnetworks given the identical network address existing in the network, established for every interface of several equipment including one management equipment connected to a network, comprises the steps of a network address calculation step for obtaining network address of a subnetwork to which an interface is connected, as for every interface, based on the IP address and the subnet mask of the interface, and as for an interface having no group ID in the configuration information, storing a pair of the network address of the interface and the equipment name of the corresponding equipment having the same interface into an address list storing unit, and as for an interface having the group ID in the configuration information, storing a pair of the network address of the interface and the equipment name of the corresponding equipment having the same interface into the address list storing unit, a management equipment key address registration step for storing the network address within information in a key address list storing unit when the information about an interface of the management equipment stored in the address list storing unit in the network address calculation step includes no group ID, and storing a pair of the network address and the group ID within the information into the key address list storing unit when the information includes group ID, a pickup step for picking up the same information as for the network address and the group ID as the head information stored in the key address list storing unit, from the information stored in the address list storing unit, and storing the same into a pickup information storing unit, and a topology information configuration step for configuring the topology information indicating that each equipment having an interface whose information is stored in the pickup information storing unit in the pickup step, is connected to the identical subnetwork represented by the network address or a pair of the network address and the group ID within the information and that the equipment having a plurality of interfaces, of all the equipment each having an interface whose information is stored in the pickup information storing unit, connects together the subnetworks indicated by the network addresses of the interfaces owned by the equipment or each pair of the network address and group ID of an interface.

In the preferred construction, the topology information automatic configuration method, further comprises an additional registration step for, when there exists the information of an interface of the equipment which has a plurality of interfaces and whose information is not stored in the key address list, in the information of each interface stored in the pickup information storing unit, additionally storing a pair of the network address and the corresponding equipment name of the interface in the rearmost portion of the key address list storing unit, as for an interface including no group ID in the configuration information, of all the interfaces owned by the equipment, and additionally storing a set of the network address, the equipment name and the group ID of the interface in the key address list storing unit, as for an interface including the group ID in the configuration information, and a deleting step for deleting the information which has been stored in the pickup information storing unit from the information stored in the address list storing unit as well as deleting the same information as the head information from the information stored in the key address list storing unit, and thereafter performing the pickup step on condition that some information remains in the key address list storing unit.

According to another aspect of the invention, a topology information automatic configuration system for configuring topology information indicating how to connect each equipment, based on configuration information, including IP address and subnet mask, established for every interface of each equipment connected to a network, comprises the steps of a network address calculation means for obtaining network address of a subnetwork to which an interface is connected, as for every interface, based on the IP address and the subnet mask of the interface, and a topology information configuration means for configuring the topology information indicating that each equipment including an interface having the identical network address obtained in the network address calculation means, is connected to the subnetwork of the above identical network address and that the equipment having a plurality of interfaces connect together the subnetworks indicated by the network addresses of the plurality of interfaces obtained in the network address calculation means.

According to another aspect of the invention, a topology information automatic configuration means for configuring topology information indicating how to connect each equipment, based on configuration information, including equipment name, IP address, and subnet mask, established for every interface of management equipment and a plurality of managed equipment connected to a network, comprises the steps of a network address calculation means for obtaining network address of a subnetwork to which an interface is connected, as for every interface, based on the IP address and the subnet mask of the interface, and storing a pair of the obtained network address of each interface and the equipment name of the corresponding equipment having the interface, into an address list storing unit, a management equipment key address registration means for storing a pair of the network address of an interface owned by the management equipment which is obtained by the network address calculation means and the corresponding equipment name, into a key address list storing unit, a pickup means for picking up the same information as that of the head of the network addresses stored in the key address list storing unit, from the information of each interface stored in the address list storing unit, and storing the same into a pickup information storing unit, and a topology information configuration means for configuring the topology information indicating that the equipment having an interface whose information is stored in the pickup information storing unit by the pickup means, is connected to the identical subnetwork represented by the network address within the information and that the equipment having a plurality of interfaces, of all the equipment each having an interface whose information is stored in the pickup information storing unit, connect together the subnetworks indicated by the network addresses of the plurality of interfaces stored in the address list storing unit.

In the preferred construction, the topology information automatic configuration system, further comprises an additional registration means for additionally storing a pair of the network address and the corresponding equipment name as for all the interfaces owned by the equipment in the rearmost portion of the key address list storing unit, when there exists some equipment which has a plurality of interfaces and whose information is not stored in the key address list, in all the equipment each having an interface whose information is stored in the pickup information storing unit, and a deleting means for deleting the information which has been stored in the pickup information storing unit from the information stored in the address list storing unit as well as deleting the same information as the head information from the information stored in the key address list storing unit, and thereafter performing the pickup means on condition that some information remains in the key address list storing unit.

According to another aspect of the invention, a topology information automatic configuration system for configuring topology information indicating how to connect each equipment, based on configuration information, including IP address and subnet mask and further including group ID for distinguishing each subnetwork as for an interface of the equipment connected to one of the subnetworks given the identical network address existing in the network, established for every interface of each equipment connected to a network, comprises the steps of a network address calculation means for obtaining network address of a subnetwork to which an interface is connected, as for every interface of the respective equipment, based on the IP address and the subnet mask of the interface, and a topology information configuration means for configuring the topology information indicating that each equipment including an interface having the identical network address obtained by the network address calculation means and including no group ID in the configuration information, is connected to the subnetwork of the above identical network address, the equipment having an interface of the identical network address obtained and the equal group ID included in the configuration information, is connected to a subnetwork represented by the above identical network address and the group ID, and that the equipment having a plurality of interfaces connects together the subnetworks represented by the network addresses of the interfaces owned by the equipment or each pair of the network address and group ID of an interface.

According to another aspect of the invention, a topology information automatic configuration system for configuring topology information indicating how to connect each equipment, based on configuration information, including equipment name, IP address and subnet mask and further including group ID for distinguishing each subnetwork as for an interface of the equipment connected to one of the subnetworks given the identical network address existing in the network, established for every interface of several equipment including one management equipment connected to a network, comprises the steps of a network address calculation means for obtaining network address of a subnetwork to which an interface is connected, as for every interface, based on the IP address and the subnet mask of the interface, and as for an interface having no group ID in the configuration information, storing a pair of the network address of the interface and the equipment name of the corresponding equipment having the same interface into an address list storing unit, and as for an interface having the group ID in the configuration information, storing a pair of the network address of the interface and the equipment name of the corresponding equipment having the same interface into the address list storing unit, a management equipment key address registration means for storing the network address within information in a key address list storing unit when the information about an interface of the management equipment stored in the address list storing unit by the network address calculation means includes no group ID, and storing a pair of the network address and the group ID within the information into the key address list storing unit when the information includes group ID, a pickup means for picking up the same information as for the network address and the group ID as the head information stored in the key address list storing unit, from the information stored in the address list storing unit, and storing the same into a pickup information storing unit, and a topology information configuration means for configuring the topology information indicating that each equipment having an interface whose information is stored in the pickup information storing unit in the pickup means, is connected to the identical subnetwork represented by the network address or a pair of the network address and the group ID within the information and that the equipment having a plurality of interfaces, of all the equipment each having an interface whose information is stored in the pickup information storing unit, connects together the subnetworks indicated by the network addresses of the interfaces owned by the equipment or each pair of the network address and group ID of an interface.

In the preferred construction, the topology information automatic configuration system, further comprises an additional registration means for, when there exists the information of an interface of the equipment which has a plurality of interfaces and whose information is not stored in the key address list, in the information of each interface stored in the pickup information storing unit, additionally storing a pair of the network address and the corresponding equipment name of the interface in the rearmost portion of the key address list storing unit, as for an interface including no group ID in the configuration information, of all the interfaces owned by the equipment, and additionally storing a set of the network address, the equipment name and the group ID of the interface in the key address list storing unit, as for an interface including the group ID in the configuration information, and a deleting means for deleting the information which has been stored in the pickup information storing unit from the information stored in the address list storing unit as well as deleting the same information as the head information from the information stored in the key address list storing unit, and thereafter performing the pickup means on condition that some information remains in the key address list storing unit.

According to another aspect of the invention, a computer readable memory storing a topology information automatic configuration program for configuring topology information indicating how to connect each equipment, based on configuration information, including IP address and subnet mask, established for every interface of each equipment connected to a network, the topology information automatic configuration program comprising a network address calculation step for obtaining network address of a subnetwork to which an interface is connected, as for every interface, based on the IP address and the subnet mask of the interface, and a topology information configuration step for configuring the topology information indicating that each equipment including an interface having the identical network address obtained in the network address calculation step, is connected to the subnetwork of the above identical network address and that the equipment having a plurality of interfaces connect together the subnetworks indicated by the network addresses of the plurality of interfaces obtained in the network address calculation step.

According to another aspect of the invention, a computer readable memory storing a topology information automatic configuration program for configuring topology information indicating how to connect each equipment, based on configuration information, including equipment name, IP address, and subnet mask, established for every interface of management equipment and a plurality of managed equipment connected to a network, the topology information automatic configuration program comprises a network address calculation step for obtaining network address of a subnetwork to which an interface is connected, as for every interface, based on the IP address and the subnet mask of the interface, and storing a pair of the obtained network address of each interface and the equipment name of the corresponding equipment having the interface, into an address list storing unit, a management equipment key address registration step for storing a pair of the network address of an interface owned by the management equipment which is obtained in the network address calculation step and the corresponding equipment name, into a key address list storing unit, a pickup step for picking up the same information as that of the head of the network addresses stored in the key address list storing unit, from the information of each interface stored in the address list storing unit, and storing the same into a pickup information storing unit, and a topology information configuration step for configuring the topology information indicating that the equipment having an interface whose information is stored in the pickup information storing unit in the pickup step, is connected to the identical subnetwork represented by the network address within the information and that the equipment having a plurality of interfaces, of all the equipment each having an interface whose information is stored in the pickup information storing unit, connect together the subnetworks indicated by the network addresses of the plurality of interfaces stored in the address list storing unit.

According to another aspect of the invention, a computer readable memory storing a topology information automatic configuration program for configuring topology information indicating how to connect each equipment, based on configuration information, including IP address and subnet mask and further including group ID for distinguishing each subnetwork as for an interface of the equipment connected to one of the subnetworks given the identical network address existing in the network, established for every interface of each equipment connected to a network, the topology information automatic configuration program comprising a network address calculation step for obtaining network address of a subnetwork to which an interface is connected, as for every interface of the respective equipment, based on the IP address and the subnet mask of the interface, and a topology information configuration step for configuring the topology information indicating that each equipment including an interface having the identical network address obtained in the network address calculation step and including no group ID in the configuration information, is connected to the subnetwork of the above identical network address, the equipment having an interface of the identical network address obtained and the equal group ID included in the configuration information, is connected to a subnetwork represented by the above identical network address and the group ID, and that the equipment having a plurality of interfaces connects together the subnetworks represented by the network addresses of the interfaces owned by the equipment or each pair of the network address and group ID of an interface.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 1 is a block diagram showing the structure of a topology information automatic configuration system according to an embodiment of the present invention;

FIG. 2 is a view showing parameters included in the configuration information of the above embodiment;

FIG. 3 is a view showing an example of a topology information configuration unit of the above embodiment;

FIG. 4 is a view showing an example of a network where topology information is to be configured;

FIG. 5 is a view showing an example of the configuration information to be entered at the time of configuring the topology information;

FIG. 7 is a view showing an example of the content of an address list stored in an address list storing unit;

FIG. 8 is a view showing the state after sorting the address list;

FIG. 9 is a view showing an example of the content of a key address list stored in a key address list storing unit;

FIG. 10 is a view showing an example of the content of a pickup information storing unit;

FIG. 11 is a view showing the topology information under configuration;

FIG. 13 is a view showing an example of the content of the key address list;

FIG. 14 is a view showing an example of the content of the address list;

FIG. 15 is a view showing an example of the content of the key address list;

FIG. 16 is a view showing an example of the content of the pickup information storing unit;

FIG. 17 is a view showing the topology information under configuration;

FIG. 19 is a view showing an example of the content of the key address list;

FIG. 20 is a view showing an example of the content of the address list;

FIG. 21 is a view showing an example of the content of the key address list;

FIG. 22 is a view showing the topology in formation obtained at last;

FIG. 23 is a diagrammatic view of the topology information of FIG. 22;

DESCRIPTION OF THE PREFERRED EMBODIMENT

Figure 6:
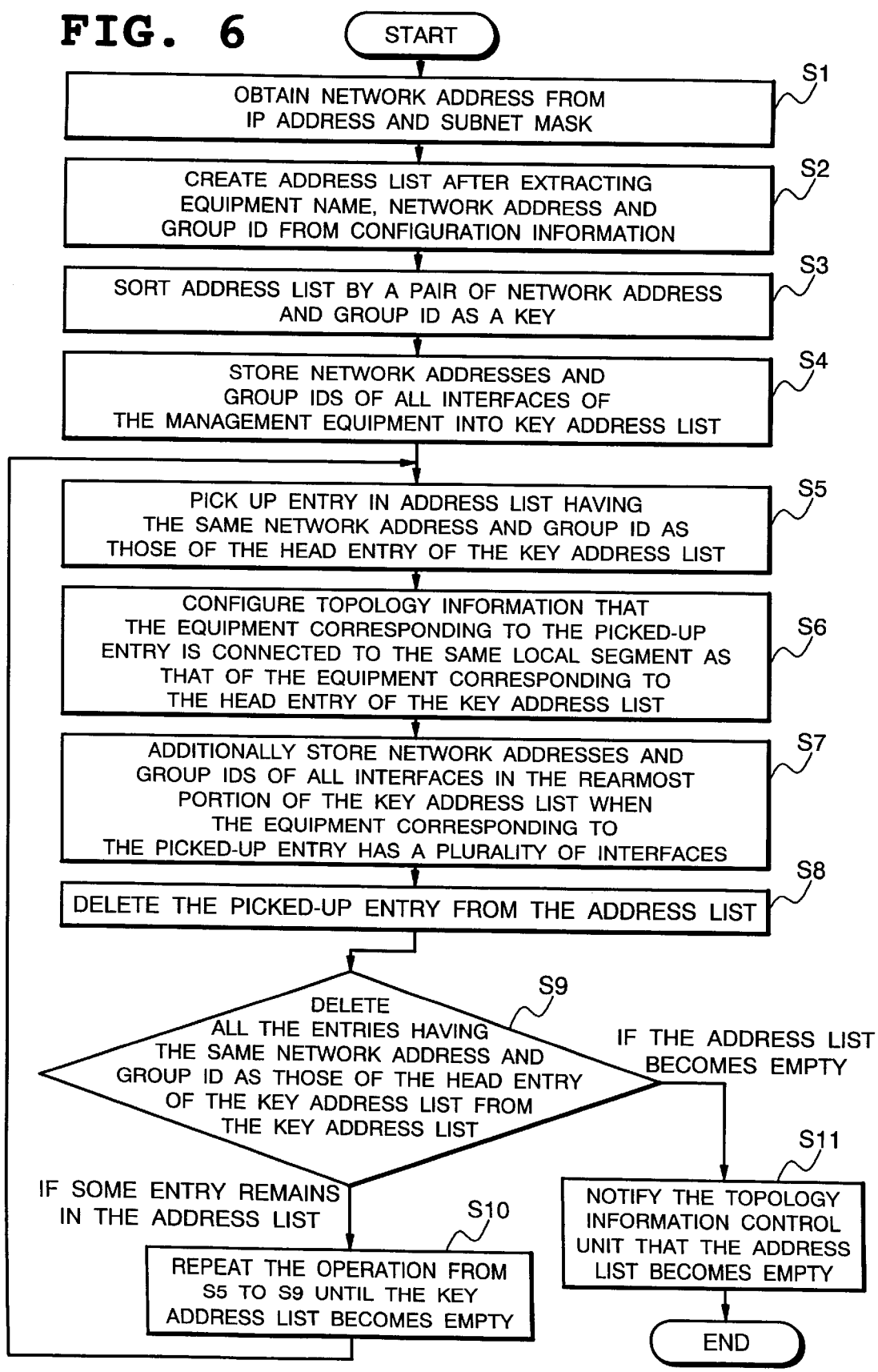
FIG. 6 is a flow chart showing an example of the operation of the topology information configuration unit.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

FIG. 1 is a block diagram of an embodiment of the present invention, including a topology information automatic configuration system 1 realized by a computer, an input/output device 5, and a storing medium 6. The topology information automatic configuration system 1 may be constituted by using a computer for realizing management equipment of a network.

The topology information automatic configuration system 1 comprises a configuration information input unit 2, a topology information configuration unit 3, and a topology information control unit 4.

The configuration information input unit 2 is a GUI for entering configuration information to be set for each interface of each equipment connected to a network where topology information is to be configured, provided with a function of passing the configuration information entered by a user from the input/output device 5 to the topology information configuration unit 3.

FIG. 2 is a view showing parameters included in the configuration information set for an interface, the parameters including equipment name, IP address, subnet mask, routing information, and group ID. Of these parameters, the equipment name, IP address, subnet mask, and routing information of the items 1 to 4 are usually used as the configuration information. The "group ID" of the item 5 is an identifier for distinguishing the local segments, in such a network as uses the same private address, including a plurality of local segments (subnetworks), and only this information is the information added in order to configure the topology information.

The topology information configuration unit 3 is provided with a function of configuring the topology information based on the configuration information received from the configuration information input unit 2.

The topology information control unit 4 is provided with a function of preserving the topology information configured by the topology information configuration unit 3 within a magnetic disk or the like.

The storing medium 6 is a disk, a semiconductor memory, or the other storing medium, which stores a program for working a computer as the topology information automatic configuration system 1. This program is read out by a computer, to control the operation of the computer, thereby realizing the configuration information input unit 2, the topology information configuration unit 3, and the topology information control unit 4.

FIG. 3 is a view showing an example of the topology information configuration unit 3, which comprises a network address calculation means 31, a sort means 32, a management equipment key address registration means 33, a pickup means 34, a topology information configuration means 35, an additional registration means 36, a deleting means 37, and a storing unit 38.

The storing unit 38 comprises a configuration information storing unit 381, an address list storing unit 382, a key address list storing unit 383, a pickup information storing unit 384, and a topology information storing unit 385.

The network address calculation means 31 is provided with a function of storing the configuration information entered from the configuration information input unit 2, into the configuration information storing unit 381, a function of requiring the network address of a local segment where an interface of each equipment is connected, based on the IP address and the subnet mask within the configuration information, a function of extracting the equipment name and the group ID (there are some cases of including no group ID) from the configuration information of each interface and by use of them and the network address already required, creating an address list including the equipment name, network address, and group ID (there are some cases of including no group ID) as for each interface, and a function of storing the created address list into the address list storing unit 382.

The sort means 32 is provided with a function of sorting the address list stored in the address list storing unit 382, by a pair of network address and group ID as a key.

The management equipment key address registration means 33 is provided with a function of storing a pair of the network address of a local segment where an interface of the management equipment is connected and the group ID within the configuration information corresponding to the same interface, into the head entry of the key address list within the key address list storing unit 383. In the case of including no group ID in the configuration information, it stores only the network address.

The pickup means 34 is provided with a function of picking up an entry having the same network address and group ID as those of the head entry of the key address list within the key address list storing unit 383, from the address list within the address list storing unit 382 and storing the information of the picked-up entry into the pickup information storing unit 384. When only the network address is stored in the head entry of the key address list, it picks up an entry in accordance with the network address stored in the head entry of the key address list, from the entries of the address list.

The topology information configuration means 35 is provided with a function of configuring the topology information that each equipment having the interface whose information is stored in the pickup information storing unit 384 is connected to the same local segment and storing the configured topology information into the topology information storing unit 385.

The additional registration means 36 is provided with a function of additionally storing in the rearmost portion of the key address list within the key address list storing unit 383, a pair of the network address and the corresponding equipment name of the interface, as for an interface including no group ID in the configuration information, of all the interfaces owned by some equipment, when there is the information of an interface about the equipment having a plurality of interfaces in the information of each interface stored in the pickup information storing unit 384 and no information about the same equipment is stored in the key address list, and additionally storing a set of the network address, equipment name, and group ID of the interface into the rearmost portion of the key address list, as for an interface whose group ID is included in the configuration information.

The deleting means 37 is provided with a function of deleting an entry having been stored in the pickup information storing unit 384 from the address list stored in the address list storing unit 382, and a function of deleting the head entry and an entry having the same content as that of the head entry from the key address list stored in the key address list storing unit 383, and thereafter, operating the pickup means 34 on condition that some entry remains in the key address list.

The operation of the embodiment will be described this time.

For example, when configuring the topology information of a network as shown in FIG. 4, having management equipment M1 and managed equipment H1 to H6, R1, and R2, a user enters the configuration information as shown in FIG. 5, using the input/output device 5 and the configuration information input unit 2.

Upon receipt of the configuration information as shown in FIG. 5, the network address calculation means 31 within the topology information configuration unit 3 stores the configuration information into the configuration information storing unit 381 and requires the network address of a local segment where an interface of each equipment is connected, based on the IP address and the subnet mask of each interface (S1), as illustrated in the flow chart of FIG. 6.

Next, the network address calculation means 31 extracts the equipment name from the configuration information corresponding to each interface and also extracts the group ID from the configuration information in which the group ID has been established. Based on the extracted information and the network address of each interface required in S1, it creates an address list as shown in FIG. 7, with the equipment name, network address, and group ID of each interface (when no group ID is included in the configuration information corresponding to the interface, group ID is not stored) stored in each entry, and stores the address list into the address list storing unit 382 (S2).

Thereafter, the sort means 32 sorts the address list within the address list storing unit 382 by a pair of the network address and group ID as a key in the ascending order (S3). As the result, the content of the address list stored in the address list storing unit 382 is as shown in FIG. 8.

The management equipment key address registration means 33 extracts the network addresses and group IDs of all the interfaces of the management equipment M1, from the information of each interface stored in the address list within the address list storing unit 382 (there is a case of including no group ID), and stores the same in the order starting from the head entry of the key address list within the key address list storing unit 383 (S4). In the case of this example, the information about the interfaces of the management equipment Ml is only that one stored in the first entry of the address list of FIG. 8, and therefore, the content of the key address list within the key address list storing unit 383 is as shown in FIG. 9.

Thereafter, the pickup means 34 picks up all the entries of the address list having the same network address and group ID as those of the head entry of the key address list and stores the contents of the picked-up entries into the pickup information storing unit 384 (S5). When only the network address is stored in the head entry of the key address list and no group ID is stored there, the pickup means 34 picks up all the entries having the same network address as that of the head entry of the key address list from the address list and stores the content of the picked-up entries into the pickup information unit 384. In the case of this example, since only the network address "123.4.5.0" is being stored in the head entry of the key address list, as shown in FIG. 9, the pickup means 34 picks up the first to fifth entries of the address list shown in FIG. 8 and stores the content thereof into the pickup information storing unit 384. As the result, the content of the pickup information storing unit 384 is as shown in FIG. 10.

The topology information configuration means 35 configures the topology information that each equipment having an interface whose information has been stored in the pickup information storing unit 384 is connected to the identical local segment, and stores the configured topology information into the topology information storing unit 385 (S6). Namely, the topology information configuration means 35 configures the topology information that the equipment whose name is stored in the pickup information storing unit 384 is connected to a local segment represented by a set of the network address and group ID stored in the pickup information storing unit 384 (a local segment represented by the network address when only the network address is stored in the pickup information storing unit 384 and no group ID is stored there).

Figure 12:
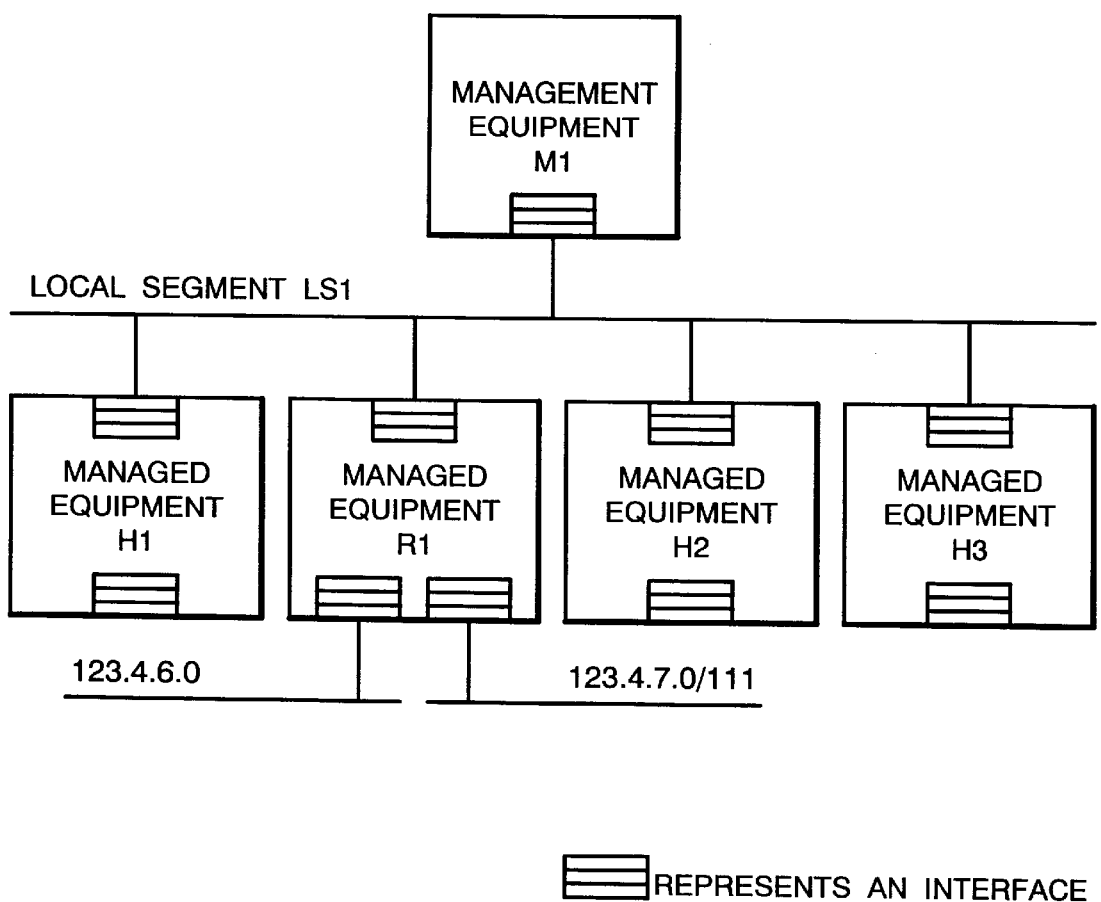
FIG. 12 is a diagrammatic view of the topology information of FIG. 11.

FIG. 11 is a view showing an example of the topology information configured when the content of the pickup information storing unit 384 is as shown in FIG. 10. FIG. 12 is a diagrammatic view of this topology information. This topology information indicates that the local segment name is "LS1", the respective equipment having the equipment names "M1", "H1", "R1", "H2", and "H3" is connected to the local segment of the network address "123.4.5.0", and that each IP address of the respective equipment is "123.4.5.8", "123.4.5.10", "123.4.5.11", "123.4.5.12", and "123.4.5.13". Further, this topology information indicates that the equipment having the equipment name R1 connects the local segment represented by the network address "123.4.6.0", the local segment represented by a pair of the network address "123.4.7.0" and the group ID "111", and the local segment LS1 together.

The local segment name "LS1" is to be set by a user using the input/output device 5. At this time, it may be designed to display the topology information shown in FIG. 11 (where the column with the "LS1" established in FIG. 11 is in the blank) and an input urging statement of the local segment on the input/output device 5, thereby to induce a user to set the local segment name.

The IP address of the respective equipment can be retrieved from the configuration information storing unit 381 with the equipment name used as a key, and when the obtained IP address is only one, the same IP address can be defined as the IP address of the equipment having the above equipment name. For example, when the configuration information is retrieved with the equipment name M1 used as a key, the obtained IP address is only "123.4.5.8", and it can be defined as the IP address of the management equipment M1. When a plurality of IP addresses are obtained, in other words, when equipment has a plurality of interfaces, such an IP address that the information indicating the local segments to which the interfaces are connected (the network address or a pair of the network address and the group ID) is in accordance with the information indicating the local segment LS1 to be processed at present is defined as the IP address of the equipment. For example, when retrieving the information with the equipment name R1 as a key, three IP addresses "123.4.5.11", "123.4.6.1", and "123.4.7.1" of three interfaces 1, 2, and 3 can be obtained, and accordingly, the information indicating the local segments to which the respective interfaces 1, 2, and 3 are connected is sought. The information indicating the local segments to which the interfaces 1, 2, and 3 are connected respectively results in "123.4.5.0", "123.4.6.0", and "123.4.7.0/111", and the information indicating the local segment to which the interface 1 is connected is in accordance with the network address "123.4.5.0" indicating the local segment LS1 which is now under processing. Therefore, the IP address "123.4.5.11" of the interface 1 is defined as the IP address of the managed equipment R1.

The other relative local segment name can be established within the topology information, for example, in the following way. Some equipment having a plurality of interfaces are searched with reference to the configuration information storing unit 381. The information indicating the local segments to which the respective interfaces owned by the searched equipment (network address or a pair of network address and group ID) are connected, is required. The information indicating the local segment now under processing is deleted from the obtained information. When the local segment name corresponding to the rest information is already established by a user, the same local segment name is established within the topology information. When the local segment name is not established by a user, the above information is established in the topology information as it is.

Upon completion of the process of the topology information configuration means 35, the additional registration means 36 judges whether there exists the information of the equipment having a plurality of interfaces in the pickup information storing unit 384 or not; when there exists no such information, a control is passed to the deleting means 37. On the contrary, when there exists the information of the equipment having a plurality of interfaces, it is further judged whether the information of the corresponding equipment has ever been stored in the key address list within the key address list storing unit 383 or not. When it has ever been stored, the control is passed to the deleting means 37. When it has never been stored, the network addresses and group IDS of all the interfaces owned by the above equipment are additionally stored in the rearmost portion of the key address list stored in the key address list storing unit 383 (S7). In the case of an interface having no group ID, only the network address is additionally stored in the rearmost portion of the key address list. In the case of this example, since the information about the equipment R1 having a plurality of interfaces has been stored in the pickup information storing unit 384 as illustrated in FIG. 10, the additional registration means 36 additionally stores the network address "123.4.5.0" of the interface 1, the network address "123.4.6.0" of the interface 2, and a pair of the network address "123.4.7.0" and the group ID "111" of the interface 3 owned by the equipment R1, in the rearmost portion of the key address list. As the result, the content of the key address list stored in the key address list storing unit 383 is as shown in FIG. 13.

Upon completion of the processing of the additional registration means 36, the deleting means 37 deletes an entry already picked up by the pickup information storing unit 384, from the address list stored in the address list storing unit 382 (S8). As the result, the address list stored in the address list storing unit 382 is as shown in FIG. 14.

Further, the deleting means 37 deletes all the entries having the same network address and group ID as those of the head entry, including the head entry, from the key address list stored in the key address list storing unit 383 (S9). When only the network address is stored in the head entry of the key address list and no group ID is stored there, all the entries having the same network address as that of the head entry are deleted from the key address list, including the head entry. As the result, the content of the key address list stored in the address key list storing unit 383 changes from the content as shown in FIG. 13 to the content as shown in FIG. 15. Further, the deleting means 37 also clears the whole information stored in the pickup information storing unit 384 in S9.

As illustrated in FIG. 15, in this example, even if performing the process of S9, since the effective entry exists in the key address list within the key address list storing unit 383, the deleting means 37 passes a control to the pickup means 34, and the process of S5 will be repeated. At this time, since the contents of the address list and the key address list stored in the address list storing unit 382 and the key address list storing unit 383 are respectively as shown in FIGS. 14 and 15, the pickup means 34 picks up the entry having the network address "123.4.6.0" from the address list, and the content of the picked-up entry is stored in the pickup information storing unit 384. As the result, the content of the pickup information storing unit 384 is as shown in FIG. 16.

Figure 18:
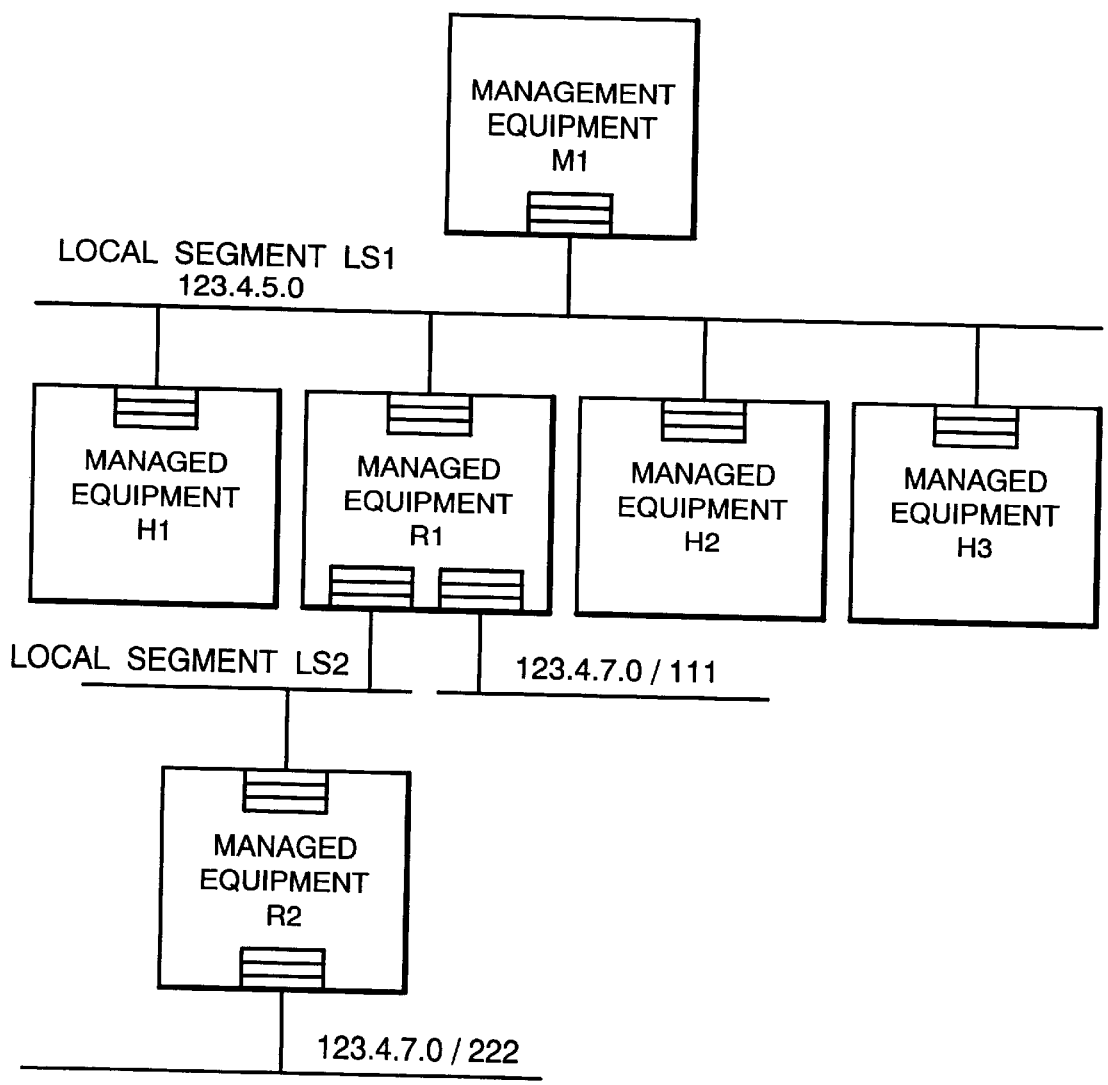
FIG. 18 is a diagrammatic view of the topology information of FIG. 17.
Figure 24:
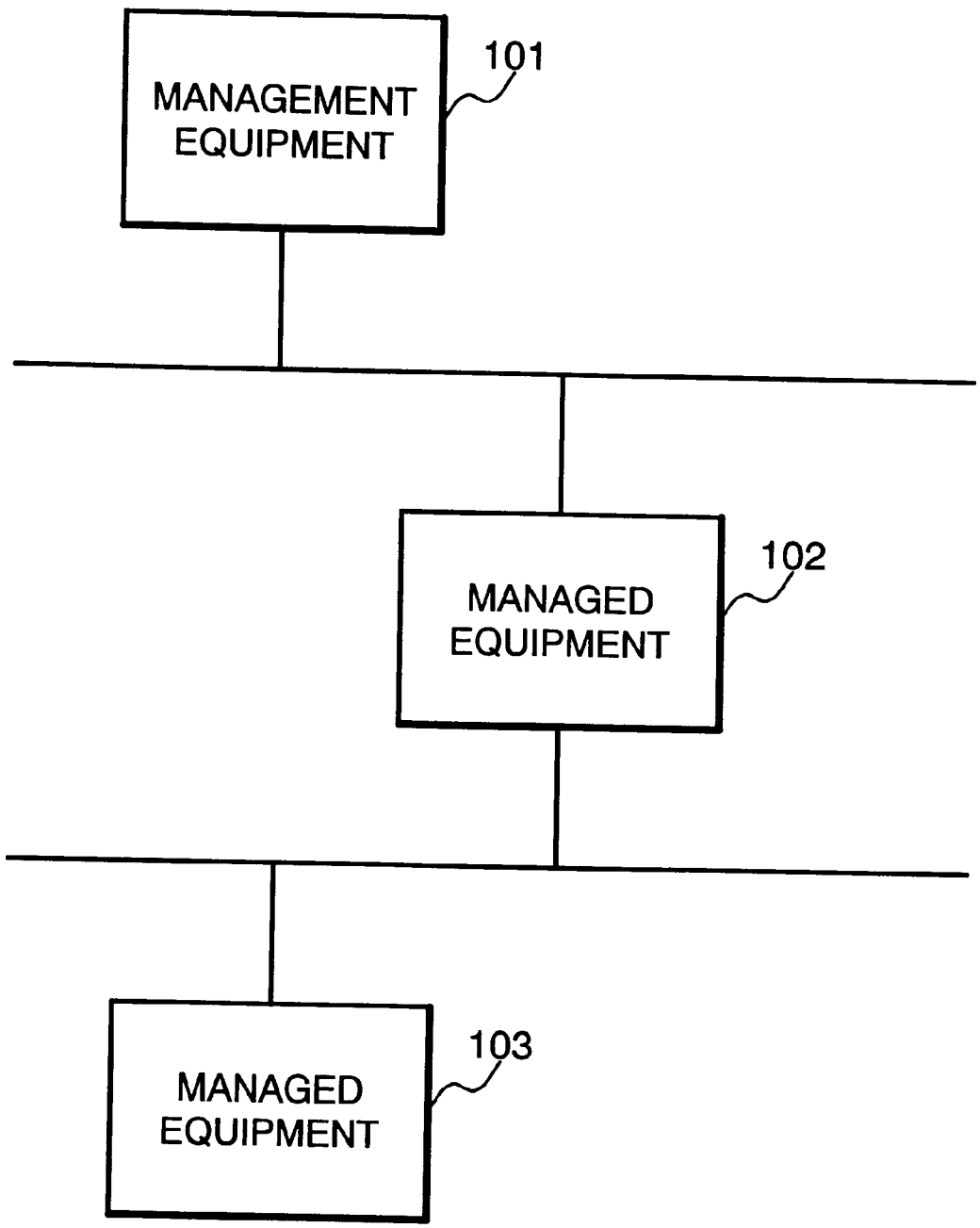
FIG. 24 is a view for use in describing that the topology information is required at automatic setting of the configuration information.

Thereafter, the topology information configuration means 35 performs the processing of S6. This S6 processing configures the topology information as for the local segment LS2 indicated by the network address "123.4.6.0", and this topology information is additionally stored in the topology information storing unit 385. As the result, the content of the topology information storing unit 385 is as shown in FIG. 17. FIG. 18 is a diagrammatic view of the topology information of FIG. 17.

The additional registration means 36 performs the processing of S7. In this case, since the information of the equipment R2 having a plurality of interfaces, which has never been stored in the key address list, is stored in the pickup information storing unit 384, as illustrated in FIG. 16, the additional registration means 36 additionally stores the network address "123.4.6.0" of the interface 1 and a pair of the network address "123.4.7.0" and the group ID "222" of the interface 2 into the rearmost portion of the key address list. As the result, the content of the key address list is as shown in FIG. 19.

Thereafter, the deleting means 37 performs the processing of S8. In this case, since the content of the address list within the address list storing unit 382 is as shown in FIG. 14 and the content of the pickup information storing unit 384 is as shown in FIG. 16, thanks to the deleting processing of S8, the content of the address list is as shown in FIG. 20.

This time, the deleting means 37 performs the processing of S9. In this case, as shown in FIG. 19, since the same information as that of the first entry (head entry) is stored in the third entry of the key address list within the key address list storing unit 383, the first and the third entries are deleted, and the content of the key address list is as shown in FIG. 21.

At this point, since another entry remains in the key address list, the pickup means 34 performs the processing of S5 again. Hereinafter, until the key address list becomes empty, the processing of S5 to S9 will be repeated. Finally, the topology information shown in FIG. 22 is configured. FIG. 23 is a diagrammatic view of this topology information.

When the key address list becomes empty, the deleting means 37 notifies the topology information control unit 4 that the configuration of the topology information has been completed (S11). Thus, the topology information control unit 4 reads out the topology information shown in FIG. 22 from the topology information storing unit 385 and stores the same in a disk or the like.

The first effect of the present invention is that the topology information can be automatically configured even if a network is not actually configured. This is because the topology information is configured based on the configuration information established for every interface of equipment connected to the network. In this way, since the present invention is able to automatically configure the topology information based on the configuration information, when the present invention is applied to, for example, equipment necessary for both the configuration information and the topology information, such as the management equipment having a function of automatically setting the configuration information in the respective managed equipment by transferring the configuration information to the respective managed equipment connected to a network, only the input of the configuration information could automatically configure the topology information on the equipment, which is very effective.

The second effect of the present invention is that the topology information can be configured even if there exists a subnetwork having the identical network address within a network using a local address, or even if the network addresses overlap each other. This is because use of the "group ID" can distinguish even the same network addresses.

The third effect of the present invention is that it can detect an error of the configuration information of the equipment before actual configuration of a network. This is because failure in the configuration of the topology information can explain an error of the configuration.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A topology information automatic configuration method for configuring topology information indicating how to connect each equipment, based on configuration information, including equipment name, IP address, and subnet mask, established for every interface of management equipment and a plurality of managed equipment connected to a network, comprising the steps of:

a network address calculation step for obtaining network address of a subnetwork to which an interface is connected, as for every interface, based on the IP address and the subnet mask of the interface, and storing a pair of the obtained network address of each interface and the equipment name of the corresponding equipment having the interface, into an address list storing unit;

a management equipment key address registration step for storing a pair of the network address of an interface owned by the management equipment which is obtained in said network address calculation step and the corresponding equipment name, into a key address list storing unit;

a pickup step for picking up the same information as that of the head of the network addresses stored in the key address list storing unit, from the information of each interface stored in the address list storing unit, and storing the same into a pickup information storing unit; and a topology information configuration step for configuring the topology information indicating that the equipment having an interface whose information is stored in the pickup information storing unit in said pickup step, is connected to the identical subnetwork represented by the network address within the information and that the equipment having a plurality of interfaces, of all the equipment each having an interface whose information is stored in the pickup information storing unit, connect together the subnetworks indicated by the network addresses of the plurality of interfaces stored in the address list storing unit.

2. A topology information automatic configuration method as set forth in claim 1, further comprising:

an additional registration step for additionally storing a pair of the network address and the corresponding equipment name as for all the interfaces owned by the equipment in the rearmost portion of the key address list storing unit, when there exists some equipment which has a plurality of interfaces and whose information is not stored in the key address list, in all the equipment each having an interface whose information is stored in the pickup information storing unit; and a deleting step for deleting the information which has been stored in the pickup information storing unit from the information stored in the address list storing unit as well as deleting the same information as the head information from the information stored in the key address list storing unit, and thereafter performing said pickup step on condition that some information remains in the key address list storing unit.

3. A topology information automatic configuration method for configuring topology information indicating how to connect each equipment, based on configuration information, including equipment name, IP address and subnet mask and further including group ID for distinguishing each subnetwork as for an interface of the equipment connected to one of the subnetworks given the identical network address existing in the network, established for every interface of several equipment including one management equipment connected to a network, comprising the steps of:

a network address calculation step for obtaining network address of a subnetwork to which an interface is connected, as for every interface, based on the IP address and the subnet mask of the interface, and as for an interface having no group ID in the configuration information, storing a pair of the network address of the interface and the equipment name of the corresponding equipment having the same interface into an address list storing unit, and as for an interface having the group ID in the configuration information, storing a pair of the network address of the interface and the equipment name of the corresponding equipment having the same interface into the address list storing unit;

a management equipment key address registration step for storing the network address within information in a key address list storing unit when the information about an interface of the management equipment stored in the address list storing unit in said network address calculation step includes no group ID, and storing a pair of the network address and the group ID within the information into the key address list storing unit when the information includes group ID;

a pickup step for picking up the same information as for the network address and the group ID as the head information stored in the key address list storing unit, from the information stored in the address list storing unit, and storing the same into a pickup information storing unit; and a topology information configuration step for configuring the topology information indicating that each equipment having an interface whose information is stored in the pickup information storing unit in said pickup step, is connected to the identical subnetwork represented by the network address or a pair of the network address and the group ID within the information and that the equipment having a plurality of interfaces, of all the equipment each having an interface whose information is stored in the pickup information storing unit, connects together the subnetworks indicated by the network addresses of the interfaces owned by the equipment or each pair of the network address and group ID of an interface.

4. A topology information automatic configuration method as set forth in claim 3, further comprising:

an additional registration step for, when there exists the information of an interface of the equipment which has a plurality of interfaces and whose information is not stored in the key address list, in the information of each interface stored in the pickup information storing unit, additionally storing a pair of the network address and the corresponding equipment name of the interface in the rearmost portion of the key address list storing unit, as for an interface including no group ID in the configuration information, of all the interfaces owned by the equipment, and additionally storing a set of the network address, the equipment name and the group ID of the interface in the key address list storing unit, as for an interface including the group ID in the configuration information; and a deleting step for deleting the information which has been stored in the pickup information storing unit from the information stored in the address list storing unit as well as deleting the same information as the head information from the information stored in the key address list storing unit, and thereafter performing said pickup step on condition that some information remains in the key address list storing unit.

5. A topology information automatic configuration means for configuring topology information indicating how to connect each equipment, based on configuration information, including equipment name, IP address, and subnet mask, established for every interface of management equipment and a plurality of managed equipment connected to a network, comprising the steps of:

a network address calculation means for obtaining network address of a subnetwork to which an interface is connected, as for every interface, based on the IP address and the subnet mask of the interface, and storing a pair of the obtained network address of each interface and the equipment name of the corresponding equipment having the interface, into an address list storing unit;

a management equipment key address registration means for storing a pair of the network address of an interface owned by the management equipment which is obtained by said network address calculation means and the corresponding equipment name, into a key address list storing unit;

a pickup means for picking up the same information as that of the head of the network addresses stored in the key address list storing unit, from the information of each interface stored in the address list storing unit, and storing the same into a pickup information storing unit; and a topology information configuration means for configuring the topology information indicating that the equipment having an interface whose information is stored in the pickup information storing unit by said pickup means, is connected to the identical subnetwork represented by the network address within the information and that the equipment having a plurality of interfaces, of all the equipment each having an interface whose information is stored in the pickup information storing unit, connect together the subnetworks indicated by the network addresses of the plurality of interfaces stored in the address list storing unit.

6. A topology information automatic configuration system as set forth in claim 5, further comprising:

an additional registration means for additionally storing a pair of the network address and the corresponding equipment name as for all the interfaces owned by the equipment in the rearmost portion of the key address list storing unit, when there exists some equipment which has a plurality of interfaces and whose information is not stored in the key address list, in all the equipment each having an interface whose information is stored in the pickup information storing unit; and a deleting means for deleting the information which has been stored in the pickup information storing unit from the information stored in the address list storing unit as well as deleting the same information as the head information from the information stored in the key address list storing unit, and thereafter performing said pickup means on condition that some information remains in the key address list storing unit.

7. A topology information automatic configuration system for configuring topology information indicating how to connect each equipment, based on configuration information, including equipment name, IP address and subnet mask and further including group ID for distinguishing each subnetwork as for an interface of the equipment connected to one of the subnetworks given the identical network address existing in the network, established for every interface of several equipment including one management equipment connected to a network, comprising the steps of:

a network address calculation means for obtaining network address of a subnetwork to which an interface is connected, as for every interface, based on the IP address and the subnet mask of the interface, and as for an interface having no group ID in the configuration information, storing a pair of the network address of the interface and the equipment name of the corresponding equipment having the same interface into an address list storing unit, and as for an interface having the group ID in the configuration information, storing a pair of the network address of the interface and the equipment name of the corresponding equipment having the same interface into the address list storing unit;

a management equipment key address registration means for storing the network address within information in a key address list storing unit when the information about an interface of the management equipment stored in the address list storing unit by said network address calculation means includes no group ID, and storing a pair of the network address and the group ID within the information into the key address list storing unit when the information includes group ID;

a pickup means for picking up the same information as for the network address and the group ID as the head information stored in the key address list storing unit, from the information stored in the address list storing unit, and storing the same into a pickup information storing unit; and a topology information configuration means for configuring the topology information indicating that each equipment having an interface whose information is stored in the pickup information storing unit in said pickup means, is connected to the identical subnetwork represented by the network address or a pair of the network address and the group ID within the information and that the equipment having a plurality of interfaces, of all the equipment each having an interface whose information is stored in the pickup information storing unit, connects together the subnetworks indicated by the network addresses of the interfaces owned by the equipment or each pair of the network address and group ID of an interface.

8. A topology information automatic configuration system as set forth in claim 7, further comprising:

an additional registration means for, when there exists the information of an interface of the equipment which has a plurality of interfaces and whose information is not stored in the key address list, in the information of each interface stored in the pickup information storing unit, additionally storing a pair of the network address and the corresponding equipment name of the interface in the rearmost portion of the key address list storing unit, as for an interface including no group ID in the configuration information, of all the interfaces owned by the equipment, and additionally storing a set of the network address, the equipment name and the group ID of the interface in the key address list storing unit, as for an interface including the group ID in the configuration information; and a deleting means for deleting the information which has been stored in the pickup information storing unit from the information stored in the address list storing unit as well as deleting the same information as the head information from the information stored in the key address list storing unit, and thereafter performing said pickup means on condition that some information remains in the key address list storing unit.

9. A computer readable memory storing a topology information automatic configuration program for configuring topology information indicating how to connect each equipment, based on configuration information, including equipment name, IP address, and subnet mask, established for every interface of management equipment and a plurality of managed equipment connected to a network, the topology information automatic configuration program comprising:

a network address calculation step for obtaining network address of a subnetwork to which an interface is connected, as for every interface, based on the IP address and the subnet mask of the interface, and storing a pair of the obtained network address of each interface and the equipment name of the corresponding equipment having the interface, into an address list storing unit;

a management equipment key address registration step for storing a pair of the network address of an interface owned by the management equipment which is obtained in said network address calculation step and the corresponding equipment name, into a key address list storing unit;

a pickup step for picking up the same information as that of the head of the network addresses stored in the key address list storing unit, from the information of each interface stored in the address list storing unit, and storing the same into a pickup information storing unit; and a topology information configuration step for configuring the topology information indicating that the equipment having an interface whose information is stored in the pickup information storing unit in said pickup step, is connected to the identical subnetwork represented by the network address within the information and that the equipment having a plurality of interfaces, of all the equipment each having an interface whose information is stored in the pickup information storing unit, connect together the subnetworks indicated by the network addresses of the plurality of interfaces stored in the address list storing unit.

10. A computer readable memory storing a topology information automatic configuration program as set forth in claim 9, the topology information automatic configuration program further comprising:

an additional registration step for additionally storing a pair of the network address and the corresponding equipment name as for all the interfaces owned by the equipment in the rearmost portion of the key address list storing unit, when there exists some equipment which has a plurality of interfaces and whose information is not stored in the key address list, in all the equipment each having an interface whose information is stored in the pickup information storing unit; and a deleting step for deleting the information which has been stored in the pickup information storing unit from the information stored in the address list storing unit as well as deleting the same information as the head information from the information stored in the key address list storing unit, and thereafter performing said pickup step on condition that some information remains in the key address list storing unit.

11. A computer readable memory storing a topology information automatic configuration program for configuring topology information indicating how to connect each equipment, based on configuration information, including equipment name, IP address and subnet mask and further including group ID for distinguishing each subnetwork as for an interface of the equipment connected to one of the subnetworks given the identical network address existing in the network, established for every interface of several equipment including one management equipment connected to a network, the topology information automatic configuration program comprising:

a network address calculation step for obtaining network address of a subnetwork to which an interface is connected, as for every interface, based on the IP address and the subnet mask of the interface, and as for an interface having no group ID in the configuration information, storing a pair of the network address of the interface and the equipment name of the corresponding equipment having the same interface into an address list storing unit, and as for an interface having the group ID in the configuration information, storing a pair of the network address of the interface and the equipment name of the corresponding equipment having the same interface into the address list storing unit;

a management equipment key address registration step for storing the network address within information in a key address list storing unit when the information about an interface of the management equipment stored in the address list storing unit in said network address calculation step includes no group ID, and storing a pair of the network address and the group ID within the information into the key address list storing unit when the information includes group ID;

a pickup step for picking up the same information as for the network address and the group ID as the head information stored in the key address list storing unit, from the information stored in the address list storing unit, and storing the same into a pickup information storing unit; and a topology information configuration step for configuring the topology information indicating that each equipment having an interface whose information is stored in the pickup information storing unit in said pickup step, is connected to the identical subnetwork represented by the network address or a pair of the network address and the group ID within the information and that the equipment having a plurality of interfaces, of all the equipment each having an interface whose information is stored in the pickup information storing unit, connects together the subnetworks indicated by the network addresses of the interfaces owned by the equipment or each pair of the network address and group ID of an interface.

12. A computer readable memory storing a topology information automatic configuration program as set forth in claim 11, the topology information automatic configuration program further comprising:

an additional registration step for, when there exists the information of an interface of the equipment which has a plurality of interfaces and whose information is not stored in the key address list, in the information of each interface stored in the pickup information storing unit, additionally storing a pair of the network address and the corresponding equipment name of the interface in the rearmost portion of the key address list storing unit, as for an interface including no group ID in the configuration information, of all the interfaces owned by the equipment, and additionally storing a set of the network address, the equipment name and the group ID of the interface in the key address list storing unit, as for an interface including the group ID in the configuration information; and a deleting step for deleting the information which has been stored in the pickup information storing unit from the information stored in the address list storing unit as well as deleting the same information as the head information from the information stored in the key address list storing unit, and thereafter performing said pickup step on condition that some information remains in the key address list storing unit.

* * * * *